US008014653B2

(12) United States Patent
Elnar

(10) Patent No.: US 8,014,653 B2
(45) **Date of Patent: *Sep. 6, 2011**

(54) O-RING SEALS FOR SPA HEATER ELEMENT

(76) Inventor: Joseph G. Elnar, Riverside, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/761,158

(22) Filed: Apr. 15, 2010

(65) Prior Publication Data

US 2010/0195993 A1 Aug. 5, 2010

Related U.S. Application Data

(62) Division of application No. 11/936,283, filed on Nov. 7, 2007, now Pat. No. 7,702,224.

(51) Int. Cl.
*A47J 31/00* (2006.01)
*F24H 1/10* (2006.01)

(52) U.S. Cl. ......... 392/466; 219/552; 219/544; 392/497

(58) Field of Classification Search ........................ None
See application file for complete search history.

(56) References Cited

U.S. PATENT DOCUMENTS

| | | | | | |
|---|---|---|---|---|---|
| 1,494,938 | A * | 5/1924 | Abbott | 174/74 R |
| 1,571,379 | A * | 2/1926 | Sharpe | 392/494 |
| 2,483,839 | A * | 10/1949 | Oakley et al. | 29/614 |
| 3,007,235 | A * | 11/1961 | Yohe | 29/614 |
| 3,303,327 | A * | 2/1967 | Himelsbaugh | 219/544 |
| 3,330,034 | A * | 7/1967 | Price | 29/611 |
| 3,934,333 | A * | 1/1976 | Churchill | 29/611 |
| 4,001,547 | A * | 1/1977 | Boggs et al. | 392/497 |
| 4,182,948 | A * | 1/1980 | Markum et al. | 219/541 |
| 4,349,727 | A * | 9/1982 | Churchill | 219/544 |
| 4,564,962 | A * | 1/1986 | Castleberry et al. | 4/541.2 |
| 4,848,616 | A * | 7/1989 | Nozaki | 204/196.11 |
| 4,924,069 | A * | 5/1990 | Giordani | 392/485 |
| 4,926,030 | A * | 5/1990 | Knauss | 219/541 |
| 5,020,128 | A * | 5/1991 | Bleckmann | 392/498 |
| 5,892,888 | A * | 4/1999 | Romero | 392/501 |
| 6,340,809 | B2 * | 1/2002 | Yamada | 219/543 |
| 6,643,454 | B1 * | 11/2003 | Rochelle | 392/485 |
| 6,941,064 | B2 * | 9/2005 | Thweatt, Jr. | 392/488 |
| 7,060,949 | B1 * | 6/2006 | Davis et al. | 219/536 |
| 7,065,293 | B2 * | 6/2006 | Thweatt, Jr. | 392/488 |
| 7,702,224 | B2 * | 4/2010 | Elnar | 392/466 |

* cited by examiner

*Primary Examiner* — Thor Campbell
(74) *Attorney, Agent, or Firm* — Kenneth L. Green

(57) ABSTRACT

A spa heater includes a heater element having a single outer wall with indentations near each end for receiving clips for positioning the heater element. The indentations are preferably stamped or formed by some other method which does not weaken the outer wall and the heater element is retained by use of the clips in the indentations. Incorporation of the indentations and the clips allows use of a single thin outer wall thereby reducing cost. The heater element is held and sealed by a combination of O-rings, stepped washers, snap rings clips, and caps. An electrical connection may be made using ring type wire ends residing under the caps or by connecting to posts extending from the ends of the heater element. The heater element is preferably a spiral heater element and a titanium outer wall may be used to resist corrosion and increases heater element life.

18 Claims, 5 Drawing Sheets

| | Incoloy 800 | Incoloy 825 |
|---|---|---|
| Nickel | 30.0 - 35.0 | 38.0 - 46.0 |
| Copper | 0.75 max | 1.50 - 3.00 |
| Iron | 39.50 min | 22.0 min |
| Manganese | 3.50 max | 1.00 max |
| Carbon | 0.10 max | 0.05 max |
| Silicon | 1.00 max | 0.50 max |
| Sulfur | 0.015 max | 0.030 max |
| Aluminum | 0.15 - 0.60 | 0.20 max |
| Titanium | 0.15 - 0.60 | 0.60 - 1.20 |
| Chromium | 15.0 - 23.0 | 19.50 - 23.50 |
| Molybdenum | | 2.50 - 3.50 |

*FIG. 11*

O-RING SEALS FOR SPA HEATER ELEMENT

The present application is Divisional of U.S. patent application Ser. No. 11/936,283 filed Nov. 7, 2007, which application is incorporated in its entirety herein by reference.

BACKGROUND OF THE INVENTION

The present invention relates to spa heater elements and in particular to a titanium electric spa heater element positioned by a snap ring.

Portable spas often use electric spa heaters. Such heaters include heating elements immersed in a flow of sometimes very corrosive liquids, especially when the high levels of chlorine or other chemicals are used to kill algae in the spa or are present do to errors in adding too much chemicals. Known heater element often include welded on fittings. Unfortunately, welding causes the metal close to the welds to be even more susceptible to corrosion.

One solution to heater element survival in such corrosive environment is to use a heater element with a titanium outer wall. Such titanium outer wall is highly resistant to corrosion, and provides an excellent heater element life. Unfortunately, titanium is expensive to machine, and the advantages of a titanium heater element are somewhat cancelled if machined fittings are used to attach the titanium heater element to a heater housing. Welding (or fusing) on the titanium fittings also may make the heater element more susceptible to corrosion.

U.S. Pat. No. 6,621,985 for "Electric Water Heater," discloses a water heater with a titanium outer wall and using compression fittings to hold the heater element to the heater housing. While the use of compression fittings is less expensive than machined titanium fittings and welding is avoided, such compression fittings apply an amount of pressure on the titanium outer wall requiring either a thick outer titanium wall, or a second wall under the outer titanium wall to support the outer titanium wall. The '985 patent discloses a second stainless steel wall under the titanium outer wall. Either a thick titanium outer wall, or a double wall, add cost to the heater element.

BRIEF SUMMARY OF THE INVENTION

The present invention addresses the above and other needs by providing a spa heater which includes a heater element having a single outer wall with indentations near each end for receiving clips for positioning the heater element. The indentations are preferably stamped or formed by some other method which does not weaken the outer wall and the heater element is retained by use of the clips in the indentations. Incorporation of the indentations and the clips allows use of a single thin outer wall thereby reducing cost. The heater element is held and sealed by a combination of O-rings, stepped washers, snap rings clips, and caps. An electrical connection may be made using ring type wire ends residing under the caps or by connecting to posts extending from the ends of the heater element. The heater element is preferably a spiral heater element and a titanium outer wall may be used to resist corrosion and increases heater element life.

In accordance with one aspect of the invention, there is provided a water heater including a heater housing having a housing wall and a heater element fixed to the housing wall. The heater housing includes a heater housing inlet for allowing a flow of water to enter the heater housing, a heater housing interior for allowing the flow of water to pass through the heater housing, and a heater housing outlet for allowing the flow of water to exit the heater housing. The heater element includes a heating portion residing in the heater housing interior, a first end, and a second end. The heater element further has an outer wall, an electrically conductive wire residing inside the outer wall and electrically insulated from the outer wall, a heat conducting dielectric insulation filling a space between the electrically conductive wire and the outer wall, and indentations circling the outer wall proximal to the ends of the heater element. The outer wall may be a corrosion resistant metal such as titanium, a nickel-chromium alloy sold under the trademark Incoloy® provided by Inco Alloys International in Huntington W. Va., or stainless steel and may be a thin outer wall. Heater element passages reside in heater housing wall and the heater element ends pass through the heater element passages. Stepped seats are formed in the exterior of the heater element passages. O-rings reside in the stepped seats between the indentations in the heater element ends and the heater housing and contain the flow of water in the heater housing interior. Snap rings engage the indentations in the heater element and spacers reside between the O-rings and the snap rings. Caps reside over the snap rings and attach to the housing wall, the snap rings, spacers, and O-rings, are thus sandwiched between the caps and the housing wall.

In accordance with one aspect of the invention, there is provided a method for attaching a heater element to a heater housing. The method includes inserting two ends of the heater element through heater element passages in the heater housing from the inside to the outside, sliding O-rings over the heater element ends and into stepped seats in the heater housing, sliding spacers over the heater element ends and on top of the O-rings, positioning snap rings on circular indentations on the heater element ends over the spacers and O-rings, and tightening a cap over the snap rings to retain the heater element ends position through the heater housing.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 11 contains the composition of Incoloy 800 alloy and Incoloy 825 alloy.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
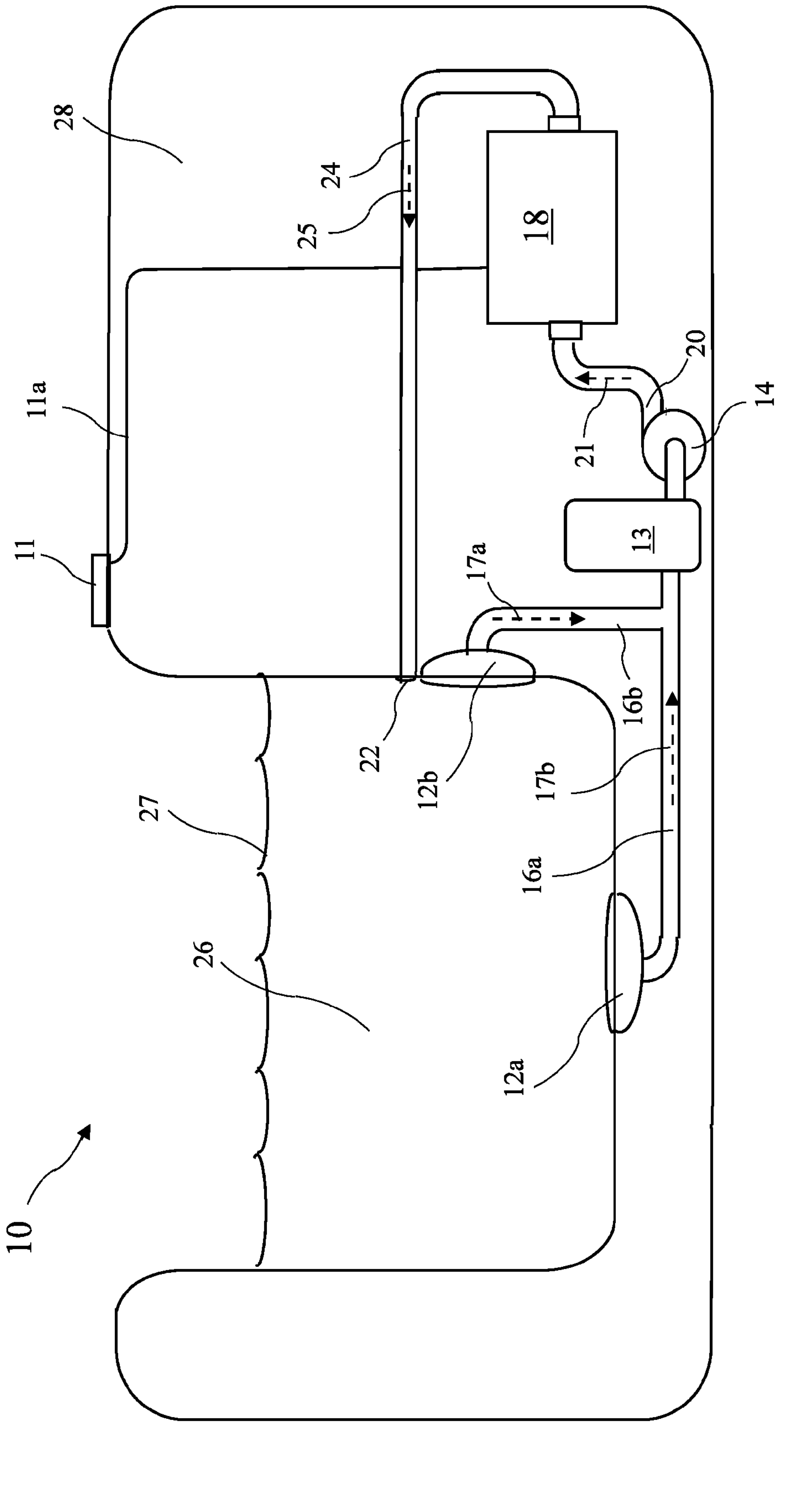
FIG. 1 is a spa including a spa heater according to the present invention.

A spa 10 is shown in FIG. 1. The spa 10 includes drains 12*a* and 12*b*. The drains 12*a*, 12*b* are in fluid communication with a pump 14 through first lines 16*a* and 16*b* carrying flows 17*a* and 17*b* respectively, through a filter 13 and to the pump 14. A spa heater/controller 18 is in fluid communication with the pump 14 through a second line 20 carrying second flow 21. A spa-side control 11 is electrically connected to the spa heater/control 18 by control wires 11*a* for controlling the spa 10, or may be wirelessly connected to the spa heater/controller 18. The heater/controller 18 is in fluid communication with at least one jet 22 through line 24 carrying a third flow 25. Water 26 is thereby circulated, filtered, and heated.

Figure 2:
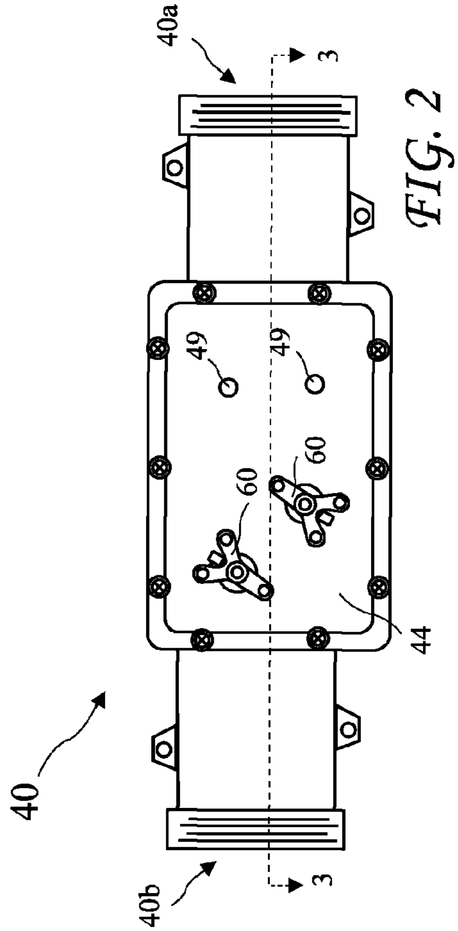
FIG. 2 depicts a side view of the spa heater.
Figure 3:
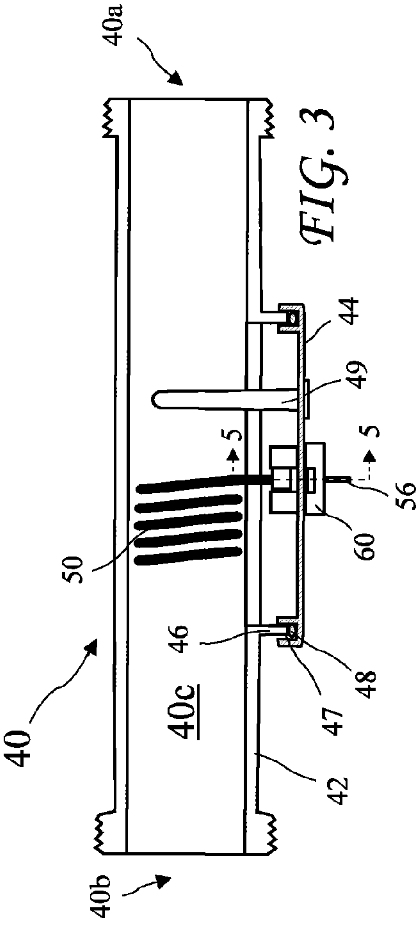
FIG. 3 is a cross-sectional view of the spa heater taken along line 3-3 of FIG. 2.

A side view of a spa heater 40 element of the heater/controller 18 is shown in FIG. 2 and a cross-sectional view of the spa heater 40 taken along line 3-3 of FIG. 2 is shown in FIG. 3. The heater 40 has a heater inlet 40*a* for allowing a flow of water to enter the heater 40, and heater outlet 40*b* for allowing the flow of water to exit the heater 40, and a heater interior 40*c* for allowing the flow of water to pass through the heater 40. One or two heater elements 50 (also see FIG. 4) reside in the spa heater 40 and are electrically connected to electrical power through a heater manifold cover 44. The manifold cover 44 mounts to a side of the heater housing 42, preferably on a cover ridge 46 which resides in a cover groove 47 in the manifold cover 44. A cover O-ring 48 resides inside the cover groove 46 to seal the cover 44 to the heater housing 42. The manifold cover 44 including the heater element(s) 50 is preferably secured to the heater manifold 42 by 10 machine screws to create a heater assembly. Each heater element 50 is held to the manifold cover 44 by caps 60 (also see FIGS. 5, and 6A-6C). Sensor wells 47 extend into the heater housing 42 for temperature probes to allow closed loop control of spa water temperature.

Figure 4:
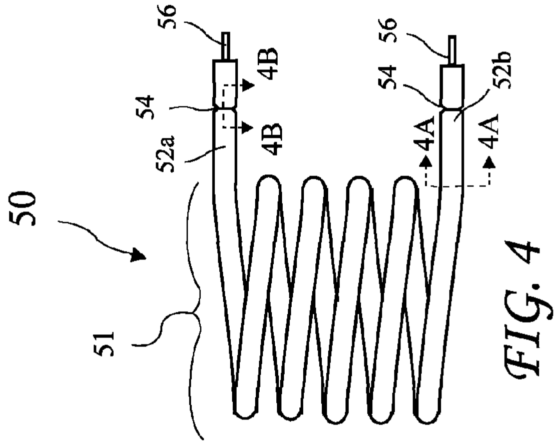
FIG. 4 is a side view of a heater element according to the present invention.
Figure 4A:
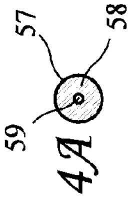
FIG. 4A is a cross-sectional view of the heater element taken along line 4A-4A of FIG. 4.
Figure 4B:
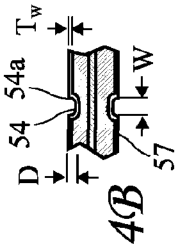
FIG. 4B is a cross-sectional view of the heater element taken along line 4B-4B of FIG. 4.

The heater element 50 is shown in FIG. 4, a cross-sectional view of the heater element 50 taken along line 4A-4A of FIG. 4 is shown in FIG. 4A, and a cross-sectional view of the heater element 50 taken along line 4B-4B of FIG. 4 is shown in FIG. 4B. The heater element 50 includes a single outer wall 57 encasing an electrically conductive wire 59 surrounded by an insulating material 58. The outer wall 57 is preferably between at least approximately 0.015 inches thick and is more preferably between approximately 0.020 and approximately 0.030 inches thick and most preferably between approximately 0.028 and approximately 0.030 inches thick. The insulating material 58 is, for example, a dielectric insulation such as magnesium oxide or other suitable dielectric medium disposed around the electrically conductive wire 59 to permit transfer of heat from the electrically conductive wire 59 to the outer wall 57, while providing electrical insulation between the electrically conductive wire 59 and the outer wall 57. The outer wall 57 is preferably a corrosion resistant metal such as titanium, a nickel-chromium alloy sold under the trademark Incoloy®, or stainless steel and may be a thin outer wall. Preferred Incoloy® alloys are Incoloy 800 alloy and Incoloy 825 alloy and the like. The composition of Incoloy 800 alloy and Incoloy 825 alloy are contained in FIG. 11.

The heater element 50 further includes indentations 54 having a depth D in the outer wall 57 proximal to the first end 52*a* and the second end 52*b* of the heater element 50. The indentations 54 preferably circle the ends 52*a* and 52*b* and preferably have sharp corners 54*a* to help retain the clip 66 (see FIGS. 5, 8A, and 8*b*) in the indentation 54. A spiral heating portion 51 of the heater element 50 resides inside the heater housing 42 and heats a flow of water through the heater 40. The indentations 54 are preferably stamped indentations made by a stamping die and have an indentation depth D and an indentation width W. The indentation depth D is preferably between approximately 0.004 inches and approximately 0.008 inches, and the indentation depth D is more preferably approximately 0.008 inches and the indentation width W is preferably between 0.044 and 0.048 inches. The indentations may be made by any process which pushes the thin wall inward and does not remove metal from the outer wall 57, thereby facilitating the use of a thin outer wall. The depth D of the indentations 54 is preferably selected to allow the clips 66 (see FIGS. 8A and 8*b*) to loosely reside in the indentations without putting radial pressure on the outer wall 57 also facilitating the use of a thin outer wall.

Figure 5:
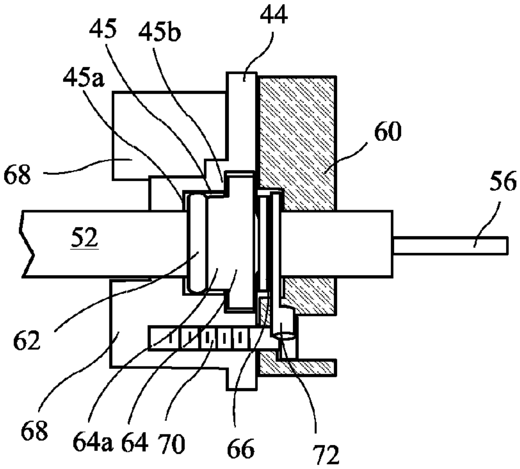
FIG. 5 is a cross-sectional view of a heater element passage in a heater housing wall showing an end of the heater element passing through the housing wall, an O-ring for sealing the heater element passage, a spacer to position the O-ring, a snap ring for retaining the spacer, and a cap attached to the housing wall for retaining the heater element, all according to the present invention

A cross-sectional view of a heater element passage in the heater housing 42 wall showing an end 52 of the heater element 40 passing through the heater housing 42 wall, an O-ring 62 for sealing the heater element passage, a spacer 64 for positioning the O-ring 62, a snap ring 66 for retaining the spacer 64, and the cap 60 attached to the housing wall for retaining the heater element 40, all according to the present invention, are shown taken along line 5-5 of FIG. 3 in FIG. 5. The O-ring 62 and spacer 64 reside in a stepped seat 45 formed in the manifold cover 44 of the heater housing 42. The stepped seat 45 preferably includes a smaller diameter first step 45*a* and a larger diameter second step 45*b*. The O-ring 62 (or other sealing element) rests against the first step 45*a* and the spacer 64 rests against the second step 45*b* and includes a smaller diameter portion 64*a* extending past the second step 45*b* and pushes the O-ring 62 inward. The snap ring 66 engages the indentation 54 (see FIG. 4) to position the snap ring 66 on the heater element end 52. The cap 60 is preferably attached to the heater housing 42 by three screws 70 but may be attached by a different number of screws or other fastener. The O-ring 62, spacer 64, and snap ring 66 are thus sandwiched between the stepped seat 45 and the cap 60.

The cooperation of the snap ring 66 with the indentation 54 results in a low level of force on the outer wall 57 (see FIG. 4A) and allows a thin outer wall to be used without, for example, a second wall under the thin wall to provide strength, with resulting cost savings.

Figure 6A:
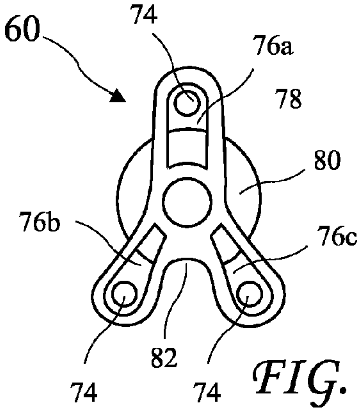
FIG. 6A is a front view of the cap.
Figure 6B:
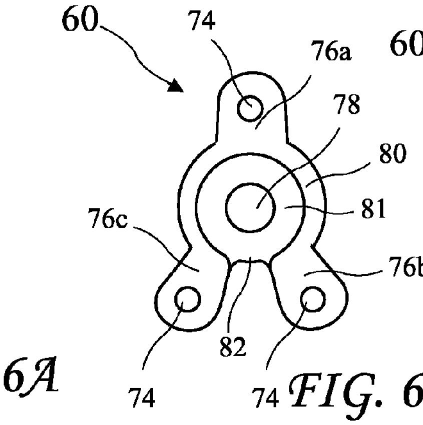
FIG. 6B is a rear view of the cap.
Figure 6C:
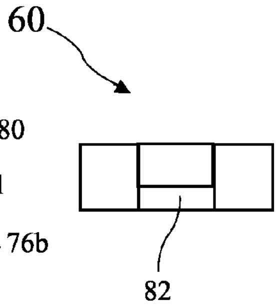
FIG. 6C is a bottom view of the cap.

A front view of the cap 60 is shown in FIG. 6A, a rear view of the cap 60 is shown in FIG. 6B, and a bottom view of the cap 60 is shown in FIG. 6C. The cap 60 includes three arms 76*a*, 76*b*, and 76*c* extending radially from a center passage 78. The center passage 78 is sized to slide over the heater element end 52. Each of the three arms includes a passage 74 of the screws 70 (see FIG. 5) which attached the cap 60 to the heater housing 42. The cap 60 further includes a round contact surface 80 for pressing against the spacer 64, and a recessed surface 81 inside the round contact surface 80 for capturing the snap ring 66, and preferably a ring type wire end 72. Bosses 68 are formed on the interior of the heater housing 42 for the screws 70.

Figure 7A:
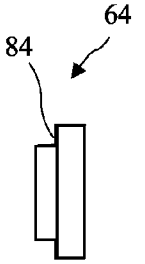
FIG. 7A is a side view of the spacer.
Figure 7B:
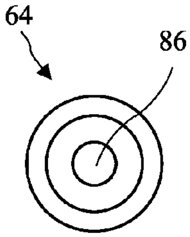
FIG. 7B is a rear view of the spacer.

A side view of the spacer 64 is shown in FIG. 7A and a rear view of the spacer 64 is shown in FIG. 7B. The spacer 64 is round and has a single step 84 which cooperates with the stepped seat 45 in the heater housing 42.

Figure 8A:
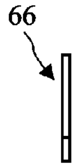
FIG. 8A is a side view of the snap ring.
Figure 8B:
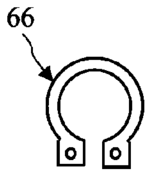
FIG. 8B is a front view of the snap ring.

A side view of the snap ring 66 is shown in FIG. 8A and a front view of the snap ring 66 is shown in FIG. 8B. The snap ring 66 is a common snap ring sized to engage the indentation 54 in the heater element end 52 (see FIG. 4) without applying more than slight force to the outer wall 57 (see FIG. 4A), and may loosely reside in the indentations and apply no force to the outer wall 57.

Figure 9A:
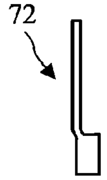
FIG. 9A is a side view of a ring type wire end useable to connect electrical wiring to the heater element.
Figure 9B:
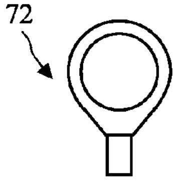
FIG. 9B is a front view of the ring type wire end.

A side view of a ring type wire end 72 useable to connect electrical wiring to the heater element 50 is shown in FIG. 9A, and a front view of the ring type wire end 72 is shown in FIG. 9B. The ring type wire end 72 is a common wire end sized to slip over the outer wall 57 and is available from most electrical supply stores.

Figure 10:
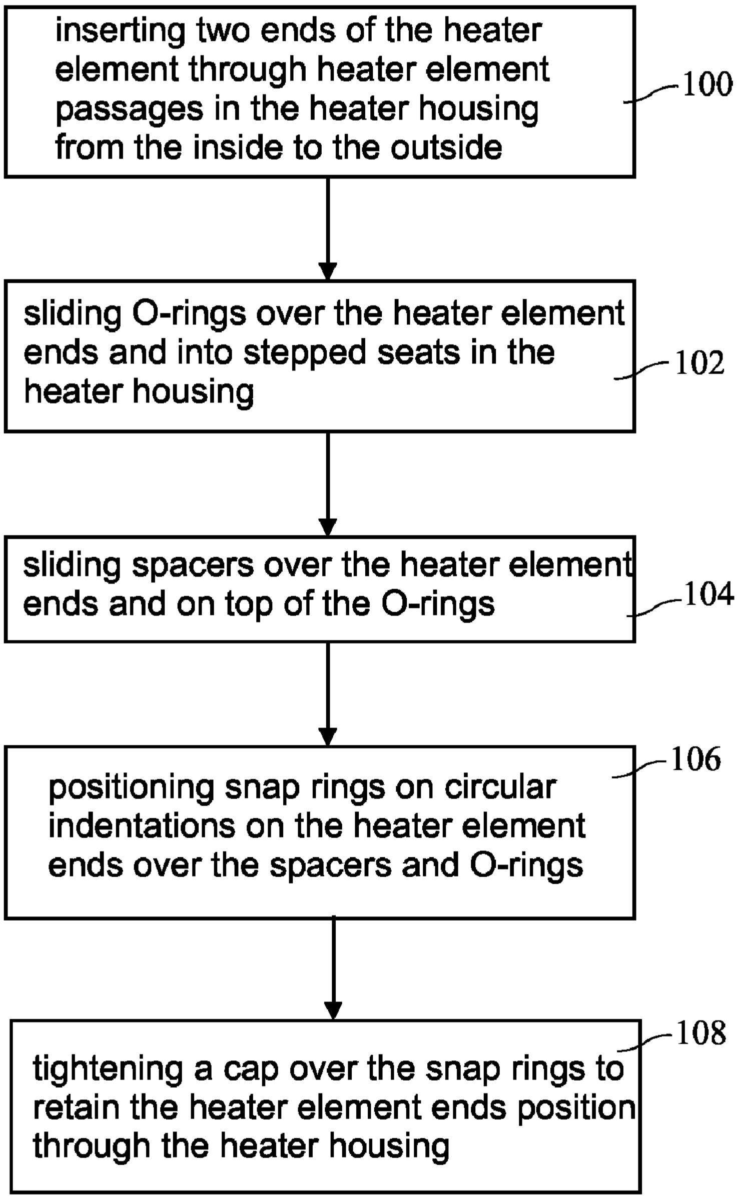
FIG. 10 is a method for connecting the heater element to the heater housing according to the present invention.

FIG. 10 is a method for connecting the heater element to the heater housing according to the present invention. The method includes inserting two ends of the heater element through heater element passages in the heater housing from the inside to the outside at step 100, sliding O-rings over the heater element ends and into stepped seats in the heater housing at step 102, sliding spacers over the heater element ends and on top of the O-rings at step 104, positioning snap rings on circular indentations on the heater element ends over the spacers and O-rings at step 106, and tightening a cap over the snap rings to retain the heater element ends positioned through the heater housing at step 108.

While the invention herein disclosed has been described by means of specific embodiments and applications thereof, numerous modifications and variations could be made thereto by those skilled in the art without departing from the scope of the invention set forth in the claims.

I claim:

1. A water heater comprising:
- a heater housing having a housing wall;
- a heater housing inlet in the housing wall for allowing a flow of water to enter the heater housing;
- a heater housing interior of the housing wall for allowing the flow of water to pass through the heater housing;
- a heater housing exterior of the housing wall opposite the heater housing interior;
- a heater housing outlet in the housing wall for allowing the flow of water to exit the heater housing;
- a heater element having a heating portion, a first end and a second end, the heating portion residing in the heater housing interior and the ends passing through the housing wall, the heater element comprising:
  - an outer wall;
  - an electrically conductive wire residing inside the outer wall and electrically insulated from the outer wall; and
  - a heat conducting dielectric insulation filling a space between the electrically conductive wire and the outer wall;
- heater element passages in heater housing wall, wherein the heater element ends pass through the heater element passages;
- seals residing in direct contact with the heater element ends outside the heater housing exterior, the seals for containing the flow of water in the heater housing interior; and
- caps residing over the seals, the seals sandwiched between the caps and the housing wall.

2. The water heater of claim 1, wherein the outer wall of the heater element is a titanium outer wall at least approximately 0.015 inches thick.

3. The water heater of claim 2, wherein the titanium outer wall is between approximately 0.020 inches and approximately 0.030 inches thick.

4. The water heater of claim 3, wherein the titanium outer wall is between approximately 0.028 inches and approximately 0.030 inches thick.

5. The water heater of claim 1, wherein the seals are O-rings.

6. The water heater of claim 5, further including indented seats at outside ends of the heater element passages, wherein the O-rings reside against the indented seats.

7. The water heater of claim 6, wherein the caps are tightened to sandwich the O-rings between the caps and the indented seats.

8. The water heater of claim 7, wherein the indented seats include a step and further including spacers residing between the caps and the O-rings, wherein the spacer include a smaller diameter portion reaching to the O-rings to sandwich the O-rings and a larger diameter portion cooperating with the steps in the indented seats to limit the entry of the spacers into the indented seats.

9. The water heater of claim 8, wherein the caps push the spacers against the O-rings.

10. The water heater of claim 8, wherein the heater housing includes a removable and replaceable manifold cover and the heater element passages reside in the manifold cover.

11. The water heater of claim 10, wherein the dielectric insulation is in direct contact with the outer wall.

12. The water heater of claim 1, wherein the outer wall of the heater element is a stainless steel material.

13. The water heater of claim 1, wherein the outer wall of the heater element is a nickel-chromium alloy having the material composition of material sold under the trademark Incoloy®.

14. The water heater of claim 1, wherein the outer wall of the heater element is a nickel-chromium alloy having the material composition of material sold under the trademark Incoloy® 800.

15. The water heater of claim 1, wherein the outer wall of the heater element is a nickel-chromium alloy having the material composition of material sold under the trademark Incoloy® 825.

16. A water heater comprising:
- a heater housing having a housing wall;
- a heater housing inlet in the housing wall for allowing a flow of water to enter the heater housing;
- a heater housing interior of the housing wall for allowing the flow of water to pass through the heater housing;
- a heater housing exterior of the housing wall opposite the heater housing interior;
- a heater housing outlet in the housing wall for allowing the flow of water to exit the heater housing;
- a heater element having a heating portion, a first end and a second end, the heating portion residing in the heater housing interior and the ends passing through the housing wall, the heater element comprising:
  - a titanium outer wall;
  - an electrically conductive wire residing inside the titanium outer wall and spaced away from contact with the titanium outer wall; and
  - a heat conducting dielectric insulation filling a space between the electrically conductive wire and the outer wall;

heater element passages reaching through the heater housing wall, wherein the heater element ends pass through the heater element passages;

indented seats at outside ends of the heater element passages;

O-ring seals residing in direct contact with the heater element ends outside the heater housing exterior; and caps residing over the O-ring seals, the O-ring seals sandwiched between the caps and the indented seats in the housing wall for containing the flow of water in the heater housing interior.

17. A method for attaching a heater element to a heater housing, the method comprising:

inserting two ends of the heater element through heater element passages in the heater housing from the inside to the outside;

sliding O-rings over the heater element ends; and tightening caps over the O-rings to sandwich the O-rings to seal the heater element passages against water leaking from the heater.

18. The method of claim 17, wherein sliding O-rings over the heater element ends includes sliding the O-rings into indented seats at outside ends of the heater element passages.

* * * * *